Patented Feb. 11, 1947

2,415,414

UNITED STATES PATENT OFFICE 2,415,414

NITRILE MANUFACTURE

William Munro Campbell, Shawinigan Falls, Quebec, Canada, assignor to Shawinigan Chemicals Limited, Montreal, Quebec, Canada, a corporation of the Dominion of Canada No Drawing. Application September 7, 1944, Serial No. 553,102. In Canada August 17, 1944

1 Claim. (Cl. 260—464)

INTRODUCTION

This invention relates to the production of unsaturated mononitriles and saturated dinitriles.

It is an object of the invention to provide a convenient method of deriving these useful compounds from readily available starting materials.

With this in mind, I have discovered that a mono- and a dinitrile or both together may be derived by the reaction of a member of the acetylene series with hydrogen cyanide or with compounds capable of splitting off hydrogen cyanide.

The starting materials correspond to the following formulae:

Hydrogen cyanide
HCN
Members of the acetylene series
$R.C \equiv CR_1$ wherein R and $R_1$ are hydrogen, alkyl or aryl.

The final products correspond to the following formulae:

$RCH = CR_1CN$    $RCHCN.CHR_1CN$ where R and $R_1$ are as defined above. In the reaction of the above starting materials the formation of the symmetrical dinitrile is unexpected since, according to the well-known rule of Markownikoff, in analogous reactions, for example that of HCl with compounds of the type $RCCR_1$, the products formed are of the type $CHR = CR_1Cl$ and $CHR_2.CR_1Cl_2$.

PREFERRED PROCEDURE

Preferably, this reaction is conducted in the presence of compounds of elements of the second group of the periodic table. Of these compounds, I prefer to employ those of magnesium and of cadmium, in particular a mixture of the oxides, or products formed therefrom during the reaction. I believe the actual catalyst to be either a mixture of these oxides with or without a trace of hydroxides or a mixture of compounds formed from the oxides or hydroxides on contact with the starting materials, during the initial stages of the reaction.

Proceeding according to my invention, a starting mixture, for instance, of acetylene and hydrogen cyanide, is passed over the catalyst at a suitable pressure and at a suitable space velocity. When employing acetylene and hydrogen cyanide as the starting materials, I prefer to conduct the reaction at substantially atmospheric pressure. Generally speaking, the temperature of the reaction is within the range from about 300° C. to about 500° C. When acetylene and hydrocyanic acid are the starting materials, I prefer a temperature range from about 340° C. to about 450° C. The space velocity may be varied widely. I have also found that for acetylene and hydrogen cyanide a suitable space velocity is from about 100 milliliters to about 500 milliliters per milliliter of catalyst per hour. The ratio of hydrocyanic acid to acetylene may also be varied over a wide range.

This procedure results in the formation of a mononitrile and a dinitrile, for instance, in the case of acetylene, succinonitrile or a mixture of succinonitrile and acrylonitrile, the amounts of other substances formed being negligible. These nitriles are then recovered and suitably purified, as for instance by distillation or by extraction.

The process may be carried out in any conventional type of reactor, preferably provided with means for the rapid removal of heat liberated during the reaction. One suitable apparatus is an iron tube reactor, heated with a molten salt bath. The catalyst is preferably mixed with iron balls to provide for temperature equalization throughout the catalyst mass. In use, the catalyst gradually becomes coated with carbon, but this does not impair its activity for a considerable time. When the activity falls below a desirable value, the accumulated carbon and tar may be burned off and the activity thus restored. It is also to be understood that unreacted gases after condensation or absorption of the reaction product may or may not be recycled.

By controlling the conditions of the reaction, the proportions of mononitrile and dinitrile produced may be regulated as desired. For instance, in the reaction of acetylene with HCN raising the reaction temperature from about 360° C. to about 380° C. increases the ratio of acrylonitrile to succinonitrile from about 1:4 to about 1:2. Moreover, by varying other conditions, such as by decreasing the space velocity, decreasing the acetylene to hydrocyanic acid ratio, etc., the dinitrile to mononitrile ratio can be increased. If desired, a yield made up almost entirely of the dinitrile can be effected.

EXAMPLES

The following examples further illustrate the invention without being, of course, in any way restrictive of its scope.

Example 1

The catalyst was prepared by co-precipitating cadmium hydroxide and magnesium hydroxide from a solution of their chlorides, with not more than the theoretical amount of sodium hydroxide. The hydroxides were washed to remove the soluble material, mixed with iron balls in a suitable reaction tube and dried "in situ" at about 350° C. to form a dry amorphous solid. This solid contained about 5 parts by weight of cadmium oxide and about 35 parts of magnesium oxide.

A mixture of about 111 parts of hydrogen cyanide and about 102 parts of acetylene were passed over the catalyst in an iron tube reactor heated with a molten salt bath substantially at atmospheric pressure and at about 355° C. at a space velocity of about 150 ml./ml. catalyst/hr. About 109 parts of liquid were condensed out and from this was recovered by distillation about 9 parts of crude acrylonitrile and about 71 parts of crude succinonitrile. About 33 parts of hydrogen cyanide and about 52 parts of acetylene were recovered from the liquid product and the uncondensed gases.

The succinonitrile and the acrylonitrile were purified by distillation.

*Example 2*

A catalyst was prepared in the same manner as in Example 1, but in this case only half the amount of catalyst was used.

A mix of about 110 parts of HCN and about 90 parts of $C_2H_2$ were passed over the catalyst heated to about 380° C. at a space velocity of about 240 ml./ml. catalyst/hr. About 93 parts of liquid were condensed out and from this was recovered about 20 parts of acrylonitrile and about 39 parts of succinonitrile. About 56 parts of HCN and about 53 parts of $C_2H_2$ were recovered.

A great advantage of the process is that useful chemicals which have been produced for years by relatively complicated and costly processes can now be synthesized from cheap and abundant raw materials.

An acetylene as used herein includes acetylene itself or another member of the acetylene series or a substitution product of such acetylenes or a gaseous mixture containing such acetylenes or substitution products which are the equivalent of acetylene for the purposes of this invention. I prefer to use acetylene and its alkyl substitution products such as, for instance, monomethyl and ethyl acetylenes. Mixtures of such acetylenes may be used.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

The process for the production of succinonitrile, comprising reacting acetylene and hydrogen cyanide in the gaseous phase at elevated temperature below about 380° C. in the presence of a catalyst consisting essentially of magnesium oxide and cadmium oxide and recovering the succinonitrile from the gaseous reaction products in which the succinonitrile is present appreciably in excess of any acrylonitrile which may be produced by condensing the reaction products and separating the succinonitrile and acrylonitrile therefrom.

WILLIAM MUNRO CAMPBELL.

REFERENCES CITED

The following references are of record in the file of this patent:

UNITED STATES PATENTS

| Number | Name | Date |
|---|---|---|
| 2,008,490 | Dietrich et al. | July 16, 1935 |
| 2,092,449 | Fuchs et al. | Sept. 7, 1937 |
| 2,294,414 | Matuszak et al. | Sept. 1, 1942 |
| 2,188,340 | Dykstra | Jan. 30, 1940 |
| 2,017,537 | Hoffman et al. | Oct. 15, 1935 |
| 2,385,551 | Spence et al. | Sept. 25, 1945 |

FOREIGN PATENTS

| Number | Country | Date |
|---|---|---|
| 559,734 | German | Sept. 23, 1932 |
| 482,300 | British | Mar. 28, 1938 |

OTHER REFERENCES

Cohen, "Organic Chemistry" (4th ed.), part I, page 243.

Whitmore, "Organic Chemistry," p. 309 (copy in 260/464).

Wieland et al., Berichte (Deutsch, Chem. Gesell.), vol. 63B (1930), page 405.

Comanducci, Chem. Abstracts, vol. 6, page 3092 (1912).

Passerini, Chem. Abstracts, vol. 25, page 633 (1931) and vol. 23 Copies in Scientific Lib.